United States Patent Office 3,255,011
Patented June 7, 1966

3,255,011
TWO-COMPONENT DIAZOTYPE PHOTOPRINTING MATERIAL SUSCEPTIBLE TO THERMAL DEVELOPMENT
Walter J. Welch, Port Dickinson, N.Y., assignor to General Aniline & Film Corporation, New York, N.Y., a corporation of Delaware
No Drawing. Filed July 1, 1963, Ser. No. 292,115
6 Claims. (Cl. 96—75)

This invention relates to an improvement in two-component light-sensitive diazotype photoprinting material susceptible to development by heating.

Two-component diazotype photoprinting material comprises a supporting sheet—such as paper or film—having in a surface coating or layer, an azo coupling component and a stabilized light-sensitive diazonium compound stabilized against premature coupling by inclusion of an acid stabilizer. On exposure of such coatings to actinic light under an opaque pattern on a translucent background the light-sensitive diazonium compound is destroyed in the light-struck areas and on subsequent exposure to an alkaline development medium such as gaseous ammonia the acid stabilizer is neutralized and the residual diazonium compound couples with the coupling component to form an azo dye image in the areas corresponding to the opaque portions of the original pattern.

It has been proposed to include in a two component light-sensitive diazotype layer of the aforesaid nature, one or more reagents having an acid to neutral reaction which, on heating, are converted or decomposed to yield an alkaline reacting compound. Diazotype photo-printing material containing such reagents can be developed after exposure to light under a pattern as mentioned above by heating at a temperature causing the aforesaid modification or decomposition. The alkaline reaction product thereby formed neutralizes the acid stabilizer and causes image-wise coupling of the residual diazonium compound with the azo coupling component.

Incorporation in diazotype materials of various reagents or combinations which provide an alkaline environment on heating have been disclosed in the prior art. Thus, U.S. Patents, 2,228,562, 2,681,277, 2,732,299 and 2,774,669 disclose diazotype photoprinting material containing nitrogen compounds (e.g. urea derivatives) which on heating, decompose to form ammonia or nitrogen bases adapted to promote the coupling of the components of two-component diazotype material. U.S. Patent 2,653,091 discloses inclusion of trichloroacetic acid as a stabilizer and an alkali metal, ammonium or nitrogen base salt thereof as a heat sensitive alkali generating compound in two-component diazotype material, the acid and salt being decomposed on heating to yield an alkali carbonate which promotes coupling.

One of the disadvantages of heat development of two-component diazotype material is the fact that elevated temperatures employed not only promote coupling of the azo coupling component and residual diazonium compound, but cause competing thermal decomposition of the latter which tends to reduce the image density and the brightness of its coloration.

We found that greatly improved results are obtained by including in heat developable two-component diazo-type photoprinting material containing a neutral to acid salt adapted to yield an alkaline compound on heating, by including in the light-sensitive layer, a lower aliphatic monocarboxy acid amid, especially formamid, or acetamid.

It was known according to U.S. Patent 2,727,820 that certain of these amids when incorporated in massive quantities in two-component diazotype material, improved the brightness and speed of development thereof by exposure to ammonia. In accordance with this invention, the amids are employed and have been found effective at substantially lower concentrations than in the aforesaid patent.

The quantities of the amids employed in accordance with this invention advantageously range from 1 to 10% of the diazotype sensitizing solution, and constitute from about 3 to about 30% of the non-volatile components of the sensitizing composition and of the resultant light-sensitive layer.

The sensitizing compositions of this invention may contain as light-sensitive stable diazonium compounds, those listed in U.S. Patent 2,501,874 and in the article by Van der Grinten in Photographic Journal Volume 92 (B) (1952), page 46. They are especially diazonium compounds derived from N-mono- or N-di-substituted p-phenylenediamines e.g. diazotization products of:

N,N-diethyl-p-phenylenediamine
N-benzyl-N-ethyl-p-phenylenediamine
N-ethyl-para-phenylenediamine
N,N-diethyl-2-ethoxy-p-phenylenediamine
N-ethyl-2-methyl-p-phenylenediamine
N,N-bis-hydroxyethyl-p-phenylenediamine
N-beta-hydroxyethyl-N-methyl-p-phenylenediamine These compounds are preferably stabilized in the form of their double salts with zinc chloride, tin chloride, cadmium chloride and the like.

Azo coupling components which can be incorporated in the materials of the invention are for example 2,3-dihydroxynaphthalene
1,8-dihydroxynaphthalene
Phloroglucinol
Resorcinol
Octylresorcinol
Alpha-resorcylamid
3-methyl-1-phenyl-5-pyrazolone
Acetoacetanilide
H-acid
2,3-dihydroxynaphthalene-6-sulfonic acid
2,5-xylenol Acid stabilizers such as citric acid, tartaric acid, boric acid, acetic acid and similar acid reacting compounds are used to prevent premature coupling of the diazonium salt and azo coupling component.

Heat responsive salts having an acid to neutral reaction at room temperatures, which are adapted to yield on heating to temperatures of 100 to 200° C., an alkaline reacting compound for neutralizing the acid stabilizer of the light-sensitive diazotype photoprinting materials of the invention, include alkali metal salts of strong organic acids which are decomposed on heating to form basic compounds such as alkali metal salts of malonic, oxalic, maleic or benzene sulphinic acids; alkali metal salts of aliphatic monocarboxy acids of 1 to 3 carbon atoms having negative chain substituents such as halogen, CN or $NO_2$ in alpha or beta positions; and especially the alkali metal (e.g. Na, K), ammonium, and nitrogen base salts of trichloroacetic acid.

In addition to the foregoing materials there can also be included reagents commonly employed in diazotype photo printing materials, as for example intensifiers such as ammonium sulfate, zinc chloride or nickel sulfate; stabilizing agents such as thiourea, or thiosinamine; accelerators such as 1-allyl-3-beta-hydroxyethyl-thiourea or 1-allyl-thiourea; hygroscopic agents such as glycol or glycerin; and wetting agents such as saponin, lauryl sulfate, keryl benzene sulfonate or oleyl-N-methyltaurine.

Moreover, there can be included, finely divided or colloidal silica or alumina, and/or aqueous dispersions or colloidal solutions of organic film-forming binders, such as colloidal water-soluble polyvinylalcohol, hydroxy-ethylcellulose, methylcellulose, gelatine or the like, or latex-like dispersions of polyvinylacetate, polyvinylchloride, polyvinylchloride-acetate, polyvinylidenechloride, polyacrylonitrile or polymethylmethacrylate.

The components of the sensitizing composition are preferably incorporated in a single solution or suspension, and applied in a single coating step to the base. The latter may be paper, or film such as regenerated cellulose, cellulose acetate or other plastic films. However, the various components of the sensitizing composition can be applied, if desired, in successive coatings—one containing, for example, the diazonium salt, and another the alkali generating heat-sensitive organic acid salt, the azo coupling component being incorporated in either of the two layers.

The material coated in accordance with the invention is developed after exposure under an opaque pattern on a translucent background, by heating at temperatures between 100 and 200° C., and preferably between 120–160° C., at which decomposition or conversion of the acid to neutral organic acid salt to an alkaline reacting compound occurs. This promotes coupling of the residual diazonium compound with the azo coupling component in the areas corresponding to the opaque pattern to form an azo dye image.

The invention will be illustrated by the following examples, wherein parts and percentages are by weight unless otherwise indicated:

Example I

The following composition was coated on a paper base sheet and dried:

| | Parts |
|---|---|
| Citric acid | 0.5 |
| 2,3-dihydroxynaphthalene-6-sodium sulfonate | 3 |
| Polyvinylalcohol (low viscosity grade) | 4 |
| Sodium trichloroacetate | 4 |
| Magnesium chloride | 0.5 |
| Foramid | 3 |
| Aqueous 60% polyvinylacetate emulsion | 5 |
| Finely divided silica (average particle size: 3–6 microns) | 4 |
| 4-(N,N-dimethyl)-aminobenzenediazonium-chlorozincate | 0.7 |
| Water | 100 |

After drying, the paper was exposed to light under an original having an opaque pattern on a translucent background, and developed by passing through a heated chamber in which its temperature was raised to about 150° C. A bright blue image of the original pattern was rapidly formed.

For purposes of comparison, a sheet was sensitized with a similar composition from which, however, the formamid was omitted. On similar exposure and development, this sheet yielded a weak blue image.

Example II

The following composition was coated on a paper sheet:

| | Parts |
|---|---|
| Citric acid | 0.5 |
| 2,3-dihydroxynaphthalene-6-sodium sulfonate | 3 |
| Polyvinylalcohol (low viscosity grade) | 4 |
| Sodium trichloroacetate | 4 |
| Magnesium chloride | 0.5 |
| Acetamid | 3 |
| Polyvinylacetate emulsion (low viscosity grade) | 5 |
| Finely divided silica (average particle size: 3–6 microns) | 4 |
| 4-(N,N-dimethyl)-aminobenzenediazonium-chlorozincate | 0.7 |
| Water | 100 |

The paper, thus sensitized, was exposed after drying to actinic light under an original as in the preceding example. Development was again effected by passing the sheet through the heating chamber at about 150° C. A bright blue image was readily formed.

For purposes of comparison, a similarly sensitized sheet in which acetamid was omitted, developed only to yield a relatively weak blue image.

In the foregoing examples, sodium trichloroacetate can be replaced by the corresponding potassium or ammonium salts, or by nitrogen base salts such as the trichloroacetates of ethanolamine or triethanolamine. Moreover, instead of these compounds there can be used alkali metal salts of heat decomposable carboxy acids, such as oxalic, malonic, or maleic acids or of benzene sulphinic acid.

Instead of acetamid or formamid, similar amounts of propionamid or butyramide can be substituted with similar effect. The diazotype photoprinting materials of this invention yield images of excellent brightness on heat development, greatly superior to those produced with similar materials lacking the amids of this invention.

Variations and modifications can be made in the procedures, compositions and materials herein described without departing from the scope or spirit of the invention.

I claim:

1. Two-component diazotype photoprinting material susceptible to development on heating, having on a surface of a supporting sheet, a light-sensitive layer containing an azo coupling component, a light-sensitive diazonium compound, an acid stabilizer against premature coupling, a neutral to acid organic acid salt selected from the group consisting of alkali metal, ammonium and nitrogen base salts yielding an alkaline reacting compound on heating to a temperature between 100 and 200° C., and an amid of a lower aliphatic monocarboxy acid selected from the group consisting of formamid, acetamid, propionamid and butyramid amounting to about 3 to 30% by weight of the components of said light-sensitive layer.

2. Diazotype photoprinting material as defined in claim 1 wherein said amid is formamid.

3. Diazotype photoprinting material as defined in claim 1 wherein said amid is acetamid.

4. A sensitizing composition for two-component diazotype photoprinting material susceptible to development on heating, containing in an aqueous medium, an azo coupling component, a light-sensitive diazonium compound, an acid stabilizer against premature coupling, a neutral to acid organic acid salt selected from the group consisting of alkali metal, ammonium and nitrogen base salts yielding an alkaline reacting compound on heating to a temperature between 100 and 200° C., and an amid of a lower aliphatic monocarboxylic acid selected from the group consisting of formamid, acetamid, propionamid and butyramid amounting to about 1–10% of said sensitizing composition.

5. A sensitizing composition as defined in claim 4 wherein said amid is formamid.

6. A sensitizing composition as defined in claim 4 wherein said amid is acetamid.

References Cited by the Examiner
UNITED STATES PATENTS

| | | | |
|---|---|---|---|
| 2,653,091 | 9/1953 | Grieg | 96—49 |
| 2,727,820 | 12/1955 | Botkin et al. | 96—91 X |
| 2,732,299 | 1/1956 | Morrison | 96—49 |
| 3,157,503 | 12/1964 | Kosar | 96—49 |

FOREIGN PATENTS 1,249,913  11/1960  France.

OTHER REFERENCES

Degering, Outline of Organic Nitrogen Compounds, 1950, University of Lithoprinters, Ypsilanti, Michigan, pp. 408–411.

Kosar, "Photographic Science and Engineering," vol. 5, No. 4, July-August 1961, pages 239–243.

NORMAN G. TORCHIN, *Primary Examiner.*

A. D. RICCI, R. L. STONE, *Assistant Examiners.*